__United States Patent__ [19]

Doi et al.

[11] Patent Number: 4,968,864

[45] Date of Patent: Nov. 6, 1990

[54] MAGNETIC CARD CONTROL MICROWAVE OVEN

[76] Inventors: Keiichiro Doi, 4 Tsuruyamadai 3-chome, Izumi-shi, Osaka; Minoru Makita, 4-9 Nanso-cho, Higashi-osaka-shi, Osaka; Masaaki Kowada, 780 Handa, Kaizuka-shi, Osaka, all of Japan

[21] Appl. No.: 974,037

[22] Filed: Dec. 27, 1978

Related U.S. Application Data

[63] Continuation-in-part of Ser. No. 974,607.

[30] Foreign Application Priority Data

Jun. 5, 1978 [JP] Japan .................................. 82392
Jul. 4, 1978 [JP] Japan .................................. 81763
Jul. 6, 1978 [JP] Japan .................................. 82605

[51] Int. Cl.$^5$ .............................................. H05B 6/68
[52] U.S. Cl. ...................... 219/10.55 B; 219/10.55 E; 219/506; 99/325; 235/449
[58] Field of Search ............... 219/486, 489, 490, 491, 219/492, 493, 499, 509, 510, 10.55 B, 10.55 R, 10.55 E, 506; 200/46; 235/400, 419, 449; 99/325, 327, 332, 342, 335; 236/46 D, 46 F, 46 R; 340/782

[56] References Cited

U.S. PATENT DOCUMENTS

| | | | |
|---|---|---|---|
| 3,012,730 | 12/1961 | Coogan | 219/490 X |
| 3,031,558 | 4/1962 | Euler | 200/46 X |
| 3,349,369 | 10/1967 | Jensen | 235/449 X |
| 3,569,656 | 3/1971 | White et al. | 219/10.55 B |
| 3,581,030 | 5/1971 | Sedley | 200/46 |
| 3,581,285 | 5/1971 | Neema et al. | 364/900 |
| 3,814,913 | 6/1974 | Ironside et al. | 219/492 |
| 3,837,568 | 9/1974 | Goodhouse et al. | 219/492 X |
| 3,845,275 | 10/1974 | Branson | 219/490 X |
| 3,849,622 | 11/1974 | Merriam | 219/10.55 E |
| 3,857,019 | 12/1974 | Holtey | 200/46 X |
| 3,886,453 | 5/1975 | Quintiliani et al. | 200/46 X |
| 3,932,723 | 1/1976 | Tamano et al. | 219/10.55 B |
| 3,965,322 | 6/1976 | Mori | 219/10.55 B |
| 3,974,472 | 8/1976 | Gould, Jr. | 219/506 X |
| 3,978,306 | 8/1976 | Mori | 219/10.55 B |
| 4,002,887 | 1/1977 | Ouimette | 235/449 |
| 4,011,428 | 3/1977 | Fosnough et al. | 219/10.55 B |
| 4,019,175 | 4/1977 | Nakao et al. | 364/900 |
| 4,102,492 | 7/1978 | Gold et al. | 200/46 X |
| 4,104,682 | 8/1978 | Lehner et al. | 235/449 X |
| 4,119,957 | 10/1978 | Sasaki et al. | 219/10.55 B |
| 4,122,531 | 10/1978 | Tamaru et al. | 364/900 |
| 4,155,084 | 5/1979 | Klees | 340/782 X |
| 4,158,759 | 6/1979 | Mason | 219/506 X |
| 4,317,976 | 3/1982 | Noda | 219/10.55 R |
| 4,328,408 | 5/1982 | Lawson | 219/10.55 B |
| 4,339,646 | 7/1982 | Doi et al. | 219/10.55 B |
| 4,345,132 | 8/1982 | Takase et al. | 219/10.55 B |

OTHER PUBLICATIONS

Toshiba ER-899 BT-1, "The Brainwave", 5-1977.

*Primary Examiner*—Philip Leung

[57] ABSTRACT

A cooking utensil comprises a reading member responsive to a recording medium containing a cooking program which is carried out in the cooking utensil, and a control circuit responsive to the cooking program read by the reading member, thereby conducting the cooking program through properly energizing an energization circuit for the cooking utensil. The cooking program may be desirably recorded on the recording medium through input keys of the cooking utensil. The recorded cooking program can be checked whether or not it is recorded with accuracy. Cooking information of the cooking program is indicated by an indicator for representing conditions of the cooking utensil. The cooking program may be modified according to total weight of a foodstuff to be cooked.

22 Claims, No Drawings

MAGNETIC CARD CONTROL MICROWAVE OVEN

CROSS REFERENCE TO RELATED APPLICATIONS

This application is a continuation-in-part of prior application Ser. No. 974,607, filed Dec. 29, 1978.

BACKGROUND OF THE INVENTION

The present invention relates to a microwave oven in general and, more particularly, to a card control microwave oven for conducting the energization of the microwave oven according to a cooking program in the form of program instructions stored in a card.

The cooking program can be desirably recorded on a card using a card recorder implemented within the card control microwave oven.

Microwave ovens have evolved to the present stage wherein now an automatic control system is implemented using a microcomputing LSI chip. However, these microwave ovens are usually energized each time the cooking operation is carried out. Considerably troublesome procedures are then required for the cooking operation in these microwave ovens.

OBJECTS AND SUMMARY OF THE INVENTION

Accordingly, it is the primary object of the present invention to provide a novel card control cooking utensil where energization programs of a cooking power source are controlled in accordance with program instructions stored in a card.

It is a further object of the invention to provide a novel card control cooking utensil where program instructions are desirably recorded on a card for energization programs of a cooking power source.

It is a further object of the invention to provide a novel card control cooking utensil where a data checking system is adapted to program instructions for detecting the generation of errors in data stored in a card as the program instructions for energization programs of a cooking power source.

It is yet a further object of the invention to provide a novel card control cooking utensil where a program adjusting system is adapted to program instructions for adjusting time control of the program instructions with reference to information corresponding to total weight of a food to be cooked. The program instructions are energization programs for a cooking power source for cooking purposes.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a card control cooking utensil comprises a key input means, a control means, a card writing means, a card reader and a writing input means in such a manner that a cooking program is stored on and read out of a card for cooking purposes. The key input means is provided for introducing cooking program information into the control means. The control means functions to control the energization of the utensil according to the cooking program. The card writing means is operated to write-in the cooking program on a card. The writing input means is adapted to provide the cooking program instructions to store the cooking program in the card. The card reader reads out the cooking program stored in the card for driving the control means for cooking purposes.

Other aspects of the invention are that a data checking system is employed for detecting if there are errors in data stored in the card as the cooking program. The cooking program includes redundant codes to check regular cooking programs. A regularity checking circuit is employed for determining the regularity in the cooking program to be read out from the card by the card reader.

Further aspects of the invention are that a program adjusting system is employed to adjust time control of the cooking program to suitably comply with the total weight of a food to be cooked. The time control corresponding to the unit weight of the food is preliminarily stored in the cooking program. Weight information is then introduced into the cooking program in such a manner that the program adjusting system is carried out on the cooking program related to the unit weight of the food.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a perspective view of a microwave oven according to the present invention;

FIG. 2 is a right side view of the microwave oven shown in FIG. 1, the cabinet housing being omitted to more clearly show the interior arranged and electric parts included in the microwave oven;

FIG. 3 is a plane view of a card reader/writer adapted to the microwave oven illustrated in FIG. 1;

FIG. 4 is a cross-sectional view taken on line A—A in FIG. 3;

FIG. 5 is a front view of a control panel secured in the front cabinet housing of the microwave oven of FIG. 1;

FIG. 6 is a front view of a magnetic card adapted to the card reader/writer shown in FIG. 3;

FIG. 7 is a block diagram of a card reading/writing control circuit;

FIG. 8 is a schematic representation of a cooking program recorded on the magnetic card of FIG. 6;

FIG. 9 is a circuit configuration of a generation circuit for a microwave generator implemented within the microwave oven of FIG. 1;

FIG. 10 is a circuit configuration of a writing control circuit for causing write operations for the cooking program;

FIG. 11 is a front view of another magnetic card adapted for the card reader/writer shown in FIG. 3;

FIG. 12 is a parity check matrix of data contained within the cooking program depicted in FIG. 8;

FIG. 13 is a circuit configuration of a control circuit for conducting a data checking system for the microwave oven as illustrated in FIG. 1; and FIG. 14 is a circuit configuration of another control circuit for causing a program adjusting system for the microwave oven as illustrated in FIG. 1.

DESCRIPTION OF THE PREFERRED EMBODIMENTS

FIG. 1 shows a microwave oven 1 of the present invention in a perspective view, wherein a door 2 and a control panel 3 are provided. The control panel 3 will be described in detail hereinafter with reference to drawings.

FIG. 2 shows the interior of the microwave oven 1 in the right side view. The microwave oven includes a printed circuit board 4 and card reader/writer 5 both behind the control panel 3, a magnetron 6, a cooling blower therefor, a high voltage transformer 8 for driving the magnetron 6, a high voltage condenser 9, and a diode 10. The printed circuit board 4 carries a plurality of electric elements including a plurality of large scale integrated circuits which function as a central processing unit (CPU), a read only memory (ROM), a random access memory (RAM) and the like to provide a microcomputer.

FIGS. 3 and 4 illustrate the card reader/writer 5 in a plane view and a cross sectional view, respectively. In FIGS. 3 and 4, a magnetic card 11 is inserted into an inlet 15 and transferred to the inmost part thereof along a slide guide 12. The magnetic card 11 contains a cooking program in coded format processed on a food employed in the microwave oven 1. A detection switch 13 is provided at the inmost part for sensing the complete insertion of the magnetic card 11 into the inmost part to the thereby activate an indicator 14 (see FIG. 5) because the end portion of the magnetic card 11 stressed the detection switch 13 at the inmost part. A magnetic head 16 is opposed to the magnetic card 11 as the magnetic card 11 is pulled-out along the slide guide 12 for reading purposes. The magnetic head 16 subsequently reads/writes the cooking program on a magnetic coating in a striped pattern of the magnetic card 11. A timing plate 17 provides a plurality of writing timing pulses in association with the rotation of a roller 18 using a photo coupler 19 as the magnetic card 11 is pulled-out.

FIG. 5 illustrates the control panel 3 in detail where there is provided an inlet 15 for the magnetic card 11, the indicator 14, a keyboard 20, a display 21, and an operation announcement means 22. The keyboard 20 includes numeral ten keys, microwave output setting keys for controlling the microwave energy, developed by the magnetron 6 such as "DEFROST", "SIMMER" and the like, and operation instruction keys for controlling the energization of the magnetron 6 such as "START" and "STOP". There are further included within the keyboard 20 the operation instruction keys such as "CARD WRITE", "CLOCK", "TEMP" and the like. The microwave output setting keys of "ROAST", "SIMMER", and "HOLD" are provided for setting the microwave output energy, respectively, 70%, 50%, and 0% of full energy.

The display 21 comprises six digits each consisting of a cross-in-square numeric configuration, which indicate the cooking time data or the like. The operation announcement means 22 are provided for indicating the operation conditions of the microwave oven 1. The operation announcement means 22 comprise a plurality of well known displays such as light emitting diodes.

FIG. 6 depicts a front view of a program card 107 referred to the magnetic card 11 and FIG. 8 illustrates a schematic representation of the cooking program in alignment recorded on the magnetic coating 107a for example. With reference to FIG. 6 on the program card 107, cooking information including a menu, a cooking material, and a cooking timetable correlated to the cooking program stored in the magnetic card are printed for convenience.

In FIG. 8 the program card 11 contains the cooking program in the magnetic coating 107a. The performance of the cooking program using the microwave oven 1 is conducted in accordance with cooking instructions allocated between "STX" representative of a program start signal and "ETX" representative of a program end signal. A data indication signal B is utilized for announcing the presence of cooking time data in the subsequent column. Another data indication signal A, on the other hand, is allocated for indicating the presence of microwave energy data in the subsequent column. An operation instruction signal C is recorded between the respective steps to divide these steps.

FIG. 7 shows a card reading/writing control circuit for causing reading and writing of the cooking program. The card reading/writing control circuit comprises a card reader/writer unit 152, a CPU 110, a decoder 109, an encoder 112, a pulse amplifier 116, a keyboard unit 104, a RAM 111, a relay "1" 117, and a relay "2" 118.

In operation, the magnetic head 16 functions to read or write the cooking program of the magnetic coating 107a while the program card 107 is pulled-out. The magnetic card 107 is drawn into the card reader/writer unit 152 and then pulled out therefrom for the reading/writing purposes after the indicator 14 is illuminated. The magnetic head 16 reads the cooking program to thereby transfer the data to a decoder 109. The decoder 109 decodes the data to apply the cooking program to the central processing unit (CPU) 110. Cooking program information to be read-out is introduced into and stored in the RAM 111 through the decoder 109 and the CPU 110.

Another set of the cooking program information, on the other hand, is introduced by the actuation of keys on the keyboard 20 (104 in FIG. 7) disposed on the control panel 3 to be once stored in the RAM 111. This set of the cooking program information is subsequently recorded on the program card 107 by supplying the cooking program information into the magnetic head 16 through the CPU 110 and the encoder 112 in accordance with the actuation of "CARD WRITE" key. In writing the cooking program, a timing plate 113 denoted as 17 in FIG. 4 provides a plurality of writing timing pulses WCP. The timing plate 113 is rotated in unison with the drawing of the program card 107 to intermittently restrict the lightpath between an illumination element 114 and an accepter 115 which are employed as a photo coupler.

The writing timing pulses WCP are entered into both the encoder 112 and the CPU 110 after being amplified within the pulse amplifier 116. The writing timing pulses WCP are utilized for writing the cooking program on the program card 107 using the magnetic head 16 in such a manner that the cooking program information is recorded in order. The CPU 110 generates cooking signals COOK and microwave output control signals PW according to the actuation of a "START" key on the basis of the cooking program information to be stored in the RAM 111. The cooking signals COOK and the microwave output control signal PW are utilized for driving a cook relay 23 and a control relay 26, respectively.

FIG. 9 depicts a generation circuit implemented within the microwave oven 1. The generation circuit comprises two relays 23 and 26, three relay switches 24, 25 and 27, a triac 28, a high voltage transformer 29, a heater transformer 30, a blower motor 31, a stir fan motor 32, an oven lamp 33, a secondary rectifier circuit 34 and a magnetron 35. The control circuit functions to control the energization of the magnetron 35 in terms of the magnetic card 11.

The relay 23 is activated in response to the cooking signal COOK applied thereto so that it controls the opening and closing of the relay switches 24 and 25. The relay 26 is energized in response to the microwave output control signals PW impressed thereto so that it selects the opening and closing of the relay switch 27. The relay 26 controls the activation of the triac 28. The relay switch 24 functions to provide switching of an AC power (100 V) applied to the high voltage transformer 29 since the relay switch 24 is connected between the AC power and the triac 28. The relay switch 25, on the other hand, operates as switching for the heater transformer 30, the blower motor 31, the stir fan motor 32, and the oven lamp 33.

Assuming that the key START of the control panel 3 is activated to provide the cooking signals COOK, the magnetron 35 receives a high voltage through the secondary rectifier circuit 34 of the high voltage transformer 29 to thereby develop microwave energy. The triac 28 activates intermittently in accordance with a duty of the microwave output control signal PW which is a pulse signal. The magnetron 35 develops the microwave energy according to the intermittent ratio between 0% and 100%. The cooking signals COOK and the microwave output control signals PW are both generated by the CPU 110 according to the cooking program recorded on the program card 107. The generation of the cooking signals COOK depends on the cooking time information of the respective steps in the cooking program. Similarly, the occurrence of the microwave output control signals PW results from microwave generation information of the same.

Now turning back to FIG. 8, the cooking program is recorded on the program card 107 for defrosting a roast of three pounds as described below.

TABLE 1

|  | Cooking Time | Microwave Energy |
|---|---|---|
| The First Cooking Step | 7 minutes and 30 seconds | Roast 70% |
| The Second Cooking Step | 3 minutes and 40 seconds | Hold 0% |
| The Third Cooking Step | 6 minutes | Simmer 50% |

When the program card 107 is inserted into, the card reader/writer unit 152 and thereafter the START key is attached, the CPU 110 provides the cooking signals COOK during 18 minutes and 10 seconds which are the sum of the above-mentioned cooking times regarding all the cooking steps. The microwave output control signals PW are also developed from the CPU 110 but having different duty cycles at each cooking step.

In accordance with the cooking signals COOK in response to the actuation of the "START" key, the first cooking program is carried out. At the first cooking program, the magnetron 35 is intermittently driven by the microwave output control signals PW having a duty cycle of 7/3 for 7 minutes and 30 seconds. The energy provided by the magnetron 35 is 70% in comparison with the total energy.

The second cooking step is then implemented only when the heat stored in the roast during the first cooking step functions to defrost the roast. The third cooking step is further implemented in a similar manner. The cooking signals COOK finally disappear and the defrosting operations are completed.

FIG. 10 illustrates a writing control circuit for causing write operations according to the present invention. Various elements of the writing control circuit are described below in accordance with the explanation regarding the operation of the same.

A set of the cooking program information to be written on the program card 107 is derived by the actuation of the numeral ten keys and the microwave output setting keys such as "DEFROST", "SIMMER" and the like. The CPU 110 receives the cooking time information and the microwave generation information regarding the respective steps in the cooking program through an OR gate 131. The cooking time information and the microwave generation information are included within the set of the cooking program information. An accumulator 132 permits the first to the fourth registers 133 to 136 to store the cooking time information and the microwave generation information. AND gates 137 to 140 become conductive in a time-sharing manner in accordance with the application of signals T1 to T4 to the AND gates 137–140. The first register 133 accepts the cooking time information and the microwave generation information at the first cooking step. The second register 134 similarly receives the same at the second cooking step. The set of the cooking program information is subsequently indicated by the display 521 through a display register 141.

In response to the actuation of "CARD WRITE" key included within the keyboard 20 and after the entry of a set of the cooking program instructions using the various keys within the keyboard 20, writing instruction signals CR are developed to set a flip-flop 142 to thereafter make an AND gate 143 conductive Upon the occurrence of the writing instruction signals CR, signals T5 to T8 are developed for subsequently making AND gates 144 to 147 conductive. The signals T5 to T8 are generated by the CPU 110. The RAM 111 transfers the set of the cooking program information stored in the first register 133 to the CPU 110 through an OR gate 148.

In the CPU 110, an encoding circuit 149 receives thus transferred cooking program information to compound the same with row and column parity check codes developed from parity check code generation circuit 150, thereby allowing a register 151 to subsequently store the compound cooking program information. Meanwhile, the program start signal "STX" and the program end signal "ETX" are both stored in the first and the last storing locations of the register 151.

When the program card 107 to be written is pushed into the card reader/writer unit 152 up to the inmost position, a card insertion completion switch 153 becomes closed to develop a one-shot pulse from a one-shot pulse generator 154 so that a flip-flop 155 is set. The flip-flop 155 develops writing waiting signals C1. A writing allowance detection switch 156 is provided for sensing missing information in the corner of the program card 107. If there is no missing information in the corner, the writing allowance detection switch 156 becomes closed to generate writing allowance signals C2 from an inverter 157.

An AND gate 158 in the CPU 110 receives the writing waiting signals C1 and the writing allowance signals C2, whereby the transfer from the register 151 to an I/O port 159 is waiting. When the card insertion completion switch 153 becomes closed, the indicator 14 of the control panel 3 is illuminated to indicate that an operator should pull the program card 107 out of the card reader/writer unit 152, as described above. The timing plate 17 is rotated in association with the pulling-out operation of the program card 107 to develop the writing timing pulses WCP from the pulse amplifier 116 as previously mentioned with reference to FIG. 7.

An AND gate 161 receives the writing waiting signals C1, the writing allowance signals C2, and the writing timing pulses WCP to generate shift pulses applied to the register 151 in association with the writing timing pulses WCP. The register 151 transfers the stored data therein to the I/O port 159 subsequently during the shift operations and in accordance with the shift pulses entered by the AND gate 161.

There are provided an encoder 112 for amplifying thus transferred data. The magnetic head 16 is operated to write the received cooking program information on the magnetic coating 107a in the program card 107 now being pulling-out. The CPU 110 also contains an error detection circuit 162 which provide error signals ER representative of incomplete conditions for writing the cooking program information. It is meant by the "incomplete" conditions that the program card 107 may be stopped during the pulling out operations or some of the cooking program information may not be written on the program card 107, the cooking program information being contained within the RAM 111.

The error detection circuit 162 contains a comparator 164 for comparing the data derived from a buffer register 163 and a memory 165. The buffer register 163 contains the current data from the register 151. The memory 165 stores the code of the program end signal "ETX". The comparator 164 permits a flip-flop 166 to be set when the shift operations of the register 151 are completed. Then an AND gate 167 outputs completion signals OK.

If the program card 107 is wholly pulled out before the shift operations of the register 151 are completed, the completion signals OK are not developed. An AND gate 169 become conductive due to the inversion operation of an inverter 168 to provide the error signals ER. A flip-flop 170 then remains set by the output of an integrating circuit 171 which accepts the writing timing pulses WCP. The flip-flop 170 develops proceeding signals C3 representative of the proceeding of the drawing operations of the program card 107. Since the comparator 164 can not determine the coincidence between the data of the buffer register 163 and that of the memory 165, the error signals ER are developed from the AND gate 169 even with the setting of the flip-flop 170. In response to the error signals ER, the display 21 indicates error displays of "ERROR" to announce that the operator must re-write the cooking program again.

The plurality keys are activated for writing the cooking program on the program card with reference to the cooking program shown in FIG. 8 as mentioned below. Each of the cooking time information and the microwave generation information at the first cooking step is introduced by actuating the numeral keys of "7", "3", "0" in order and, thereafter, operating the "ROAST" key. Each of the same at the second cooking step is entered by activating the numeral keys of "3", "4", "0" in this order of entry and, thereafter, actuating the "HOLD" key. Similarly, each of the same at the third cooking step is entered by depressing the numeral keys of "6", "0", "0" in this order and pressing the "SIMMER" key. The fourth cooking step shown in FIG. 8 is not required to correspond to the cooking program for enabling the defrosting of the roast of the three pounds as summarized above.

The data corresponding to all of the key operations are stored in the RAM 111 as mentioned previously. Thereafter, the "CARD WRITE" key is actuated. The program card 107 is drawn back out of the card reader/writer unit 152 after the illumination of the indicator 14 to automatically write the entered cooking program on to the program card 107.

Further aspects of the present invention are described below where a data checking system is provided for determining whether the cooking program information has been recorded on the program card 107 with accuracy and/or the cooking program information has been exactly read from the program card 107. If there is any error in the recorded cooking program information, the microwave oven is prevented from being energized and the presence of the error is announced. The recorded cooking program information containing the error is indicated for the purpose of announcing the error information to the operator. The microwave oven 1 providing the data checking system utilizes the magnetic card 11 illustrated in FIG. 11. The magnetic card 11 includes the cooking program, for example, equivalent to that of FIG. 8 with the exception of the absence of the fourth cooking step to enable the defrosting of the roast of the three pounds as summarized in Table 1. The signal denoted as LRC of the cooking program concerns a group of column parity check codes. The column parity check codes LRC comprise four bits of binary coded decimal for representing the information and one bit of a row parity check code as a redundant code.

FIG. 12 is a parity check matrix corresponding to the cooking program illustrated to FIG. 8 but eliminating the fourth cooking step. The row parity check codes added to the respective data are determined in such a manner that if there is an even number of the figure "1" in the respective data, one row parity check code is selected to be "1". On the other hand, one row parity check code is determined to be "0" when there is odd number of the figure "1". The parity check matrix is then composed in such a manner that the respective column data codes include the odd number of the figure "1".

The data indication signal LRC, on the other hand, contains the group of the column parity check codes to provide the even number of the figure "1" in the respective row vector codes. That is, one of the column parity check codes is selected to be "0" when the even number of the figure "1" is contained in the relevant row vector codes concerning all the cooking program data. If the odd number of the figure "1" is contained, one of the column parity check codes is assumed to be "1".

FIG. 13 is a data checking circuit according to another embodiment of the present invention. The data checking circuit is composed so as to check both the error in the cooking program information to be recorded in the magnetic card 11 and the error in the cooking program information to be read out by the card reader/writer 5. The microwave oven 1 is prevented from energizing if there is any error in the cooking program information, whereby the error conditions are announced.

Various elements and the respective functions of the data checking circuit are explained in accordance with the operations of the elements shown in FIG. 13. The magnetic card 11 is adapted to the card reader/writer 5 in order to read the cooking program information recorded on the magnetic coating 11a. The read out cooking program information is stored in a RAM 337 through a CPU 236. An encoder 250 is provided for communicating the keyboard 20 to the CPU 236. A register 238 receives, in order, the respective cooking program information, which comprises the data from the program start signal "STX" to the column parity check codes LRC in accordance with the completion of the reading operations.

The register 238 is wired so as to comprise five bits including the row parity check codes in addition to the respective cooking program information. Information related to two bits of the five bits is subjected to exclusive OR calculations offered by four gates G1 to G4. As described with reference to FIG. 12, the magnetic card 11 contains the cooking program in the form of an odd parity check system as to the row parity check codes. Therefore, the output "1" developed from the gate G4 means that the cooking program information has been exactly read, whereby an error detection circuit 239 develops the output.

The above-mentioned exclusive OR calculations are conducted concerning the respective cooking program information from the program start signal to the column parity check codes LRC using the gates G1 to G4. The error detection circuit 239 determines whether or not the output of the gate G4 is "0". Even one of the outputs "0" prevents the error detection circuit 239 from providing an output.

Another register 240 is constituted as the bits for allocating the column parity check system. The register 240 contains the information "0" at all the bits therein. When the register 238 receives the five bits (01110) referred to the program start signal "STX" in the first instance, five gates G5 to G9 are operated to conduct the exclusive OR calculations regarding the corresponding bits of the registers 238 and 240 with respect to each other, for example, the data denoted as LSB each other, the data denoted as MSB each other, and the like. A further register 241 is provided for storing the results by the exclusive OR calculations. The contents in the register 241 are transmitted into the register 240 before the register 238 accepts the next five bits (11010) related to the data indication signal B at the first cooking step.

In response to the entrance of the next data indication signal B into the register 238, the exclusive OR calculations are repeated concerning the corresponding bits of the registers 238 and 240 by the five gates G5 to G9 (i.e., 01110 undergoes exclusive OR with 11010). The register 240 accepts the respective results of the exclusive OR calculations. These exclusive OR calculations are repeated as to the remaining columns of data shown in FIG. 12, concerning the program data, from the program start signal "STX" to the column parity check codes LRC. The end result should be that register 241 contains all zeros indicating that there are an even number of 1's in the rows in FIG. 12.

The parity check matrix adapted to the subject cooking program has an even parity check system as the column parity check codes as shown in FIG. 12. All the digits of the register 241 become "0" if the cooking program information is correctly read out when the exclusive OR calculations are completed up to the column parity check codes LRC in the last data. If the cooking program information is not derived with accuracy and, otherwise, the recorded cooking program information contains an error, all the digits of the register 241 are not to "0".

Another error detection circuit 242 is provided for examining the contents of the data checking circuit 239 after the whole results of the exclusive OR calculations concerning the all cooking program information are obtained. The error detection circuit 242 does not provide an output unless all the bits of the register 241 are "0". An AND gate G10 generates OK signals when the two error detection circuits 239 and 240 develop the outputs.

According to the presence of the error in either the row parity check codes or the column parity check codes, a decoder 243 develops the output applied to the display 221 for providing the indication of "ERROR". When the signal OK is not provided from the AND gate G10, an AND gate G11 remains nonconductive even if start signals START are developed from the CPU 235 in response to the actuation of the START key. Therefore, a flip-flop 244 is not set and does not generate the cooking signals COOK. A cooking relay 223 referred to the relay 23 shown in FIG. 9 is inoperable so that the microwave oven 1 is not energized at all, e.g. the cooking program is not conducted.

In the case where there is no error in either the row parity check codes nor the column parity check codes, the signal OK is developed from the AND gate G10. The AND gate G11 becomes conductive to make the flip-flop 244 set in response to the occurrence of the start signals START. In accordance with the set of the flip-flop 244, the cooking signals COOK are developed to energize the cooking relay 223. Similarly, an AND gate G12 becomes conductive to provide the microwave output control signals PW. A microwave output control relay 226 referred to the relay 26 illustrated in FIG. 9. Then heating sequence is conducted according to the cooking program to be read.

A counter 251 is provided for providing set signals applied to the flip-flop 244 when the total cooking time contained within the cooking program is counted. A microwave output control circuit 252 is employed to provide the microwave output control signals PW on the basis of the microwave output data contained within the cooking program.

The decoder 243 begins decoding the contents of a register 245 according to the generation of the OK signal from AND gate G10. The display 21 and the operation announcement means 22 display the cooking time and the microwave output data, respectively. The register 245 is wired so that the contents of registers 246 to 248 are in turn transferred into register 245 after having a predetermined timing space. The transmittance of the contents of the registers 246 to 248 is controlled by timing signals t1 to t3 developed from a timing circuit 249.

The registers 246 to 248 store partially the cooking program information inclusive of the row parity check codes contained within the register 238. For example, the register 246 contains the codes "B 730A7" of the cooking program at the first step. The register 247 includes the codes "B340AO" at the second step. The register 248 contains the codes "B600A5" at the third step.

In accordance with the timing signals t1 to t3 which are in turn developed from the timing circuit 249, the register 245 receives in series the contents of the register 246 to provide the cooking time in the display 221 and the microwave output data in the operation announcement means 222. With respect to the abovementioned cooking program, Table 1, for defrosting the roast of the three pounds, the following indications are enabled for a predetermined time duration.

|  | The Display 21 | The operation Announcement Means 22 |
| --- | --- | --- |
| The First Step | 7:30 | Illumination of ROA |
| The Second Step | 3:40 | Illumination of HOLD |
| The Third Step | 6:00 | Illumination of SIM |

Still further aspects of the present invention are concerned with a program adjusting system for adjusting time control of the cooking program so as to suitably comply with weight of the food to be cooked. Predetermined time control information corresponding to the unit weight of the food is preliminarily stored in the cooking program in the form of coded information. Weight information is then introduced into the cooking program, which corresponds to the practical weight of the food, automatically according to the program adjusting system. The program adjusting system makes it possible to conduct a plurality of cooking applications using a small number of the cooking cards which contain the time control information on the basis of the unit weight of the cooking food.

As to the unit weight of the food, it is assumed that the roast has the three pounds and it is defrosted according to abovementioned cooking program described in Table 1. When the roast of six pounds is now defrosted, the unit cooking program should be modified in accordance with the following amendment equation.

$$T2 = (x + y \times z) T1 \quad (1)$$

where T1 is the stored cooking time in the respective steps, x and y are weight control coefficients z is the weight of the food, and t2 is the cooking time in the respective steps to be determined.

The two weight control coefficients x and y are preliminarily stored in the magnetic coating 11a in the respective magnetic cards 11 between the start signal START and the first cooking step although not illustrated in FIG. 8. In this stage, the respective weight control coefficients x and y have been selected 0.1 and 0.3, respectively. According to the amendment equation (1), the cooking program is defined as follows regarding the roast of the six pounds for defrosting purposes.

TABLE 2

|  | Cooking Time | Microwave Energy |
| --- | --- | --- |
| The First Cooking Step | 14 minutes and 15 seconds | Roast 70% |
| The Second Cooking Step | 6 minutes and 58 seconds | Hold 0% |
| The Third Cooking Step | 11 minutes and 24 seconds | Simmer 50% |

A program adjusting circuit for modifying the stored cooking program according to the amendment equation (1) will be described with reference to FIG. 14. The generation circuit shown in FIG. 9 can be adapted to the control of the microwave oven 1 for enabling the aforementioned program adjusting system.

FIG. 14 shows the program adjusting circuit of the present invention. The card reader/writer 5 functions to read the cooking program stored in the magnetic coating 11a of the magnetic card 11. The read cooking program is stored in a CPU 337 through a decoder 336. A counter 339 and a plurality of registers 340 and 343 are provided for containing the respective cooking time information and the respective microwave output energy information at the cooking program steps. The keyboard 20 of the control panel 3 contains a plurality of the numeral keys "0" to "9" and the function keys such as "ROAST", "SIMMER", "START", "HOLD" and the like as illustrated in FIG. 5. The numeral keys are utilized for introducing actual food weight information.

Assume that the magnetic card 11, containing the cooking program summarized in the Table 1, is inserted into the card reader/writer 5 and, thereafter, pulled out of the same for reading purposes, the cooking program is read to be decoded by the decoder 336. In accordance with the data indication signals A and B, and the operation instruction signal C, the respective cooking time information and microwave output energy information are stored in desirable memories by an accumulator 338 contained within the CPU 337.

The counter 339 accepts the cooking time information of 7 minutes and 30 seconds at the first cooking step. The register 340 receives the same of 3 minutes and 40 minutes at the second cooking step. Similarly, the register 341 has the same of 6 minutes at the third cooking step. The register 342 receives the two weight control coefficients of x and y, in this case 0.1 and 0.3, respectively. The respective microwave output energy information (70%, 0, 50%) is transferred into three registers 344 to 346.

Thereafter, when the numeral key "6" in the keyboard 20 is actuated for modifying purposes, the respective cooking time information stored in the counter 339, and the registers 340 and 341 is amended so as to correspond to that of the roast of six pounds according to the amendment equation (1). The information of the numeral key "6" is introduced into the CPU 337 after being encoded in an encoder 347. The CPU 337 transfers the information of the numeral key "6" into a register 343. The amendment equation (1) is stored in a ROM 348. The two weight control coefficients x and y are contained within the register 342.

Under these circumstances, in response to a micro-order M, the accumulator 338 calculates the cooking time on the basis of the cooking time information at the first cooking step stored in counter 339. The results (14 minutes and 15 seconds) are transferred into the counter 339 again. Similarly, the cooking time information at the second cooking step stored in the register 340 is calculated in succession. The results (6 minutes and 58 seconds) are transmitted into the register 340 again. Finally, the calculation procedures are common to the cooking time information at the third cooking step contained in the register 341. The results (11 minutes and 24 seconds) are sent to the register 341. If the numeral keys in the keyboard 20 are not actuated, because it is not necessary to recalculate the cooking time in accordance with the amendment equation, the above-mentioned calculation procedures are not operated.

The start key "START" in the keyboard 20 is actuated to provide the cooking start signals "START" from the CPU 337 and set a flip-flop 348. The flip-flop 348 generates the cooking signals COOK to energize the relay 324. The cooking start signals "START" are also applied to an AND gate 349. The AND gate 349 provides the output to the counter 339 by AND logic operations from the cooking start signals "START" and second signals S produced by dividing the power supply frequency 50/60 Hz in a timekeeping circuit 351. According to the output from the AND gate 349, the cooking time information stored in the counter 339 is in turn counted down.

If the contents of the counter 339 become zero, a detection circuit 350 provides end signals END to transfer the cooking time information at the second cooking step contained in the register 340 to the counter 339. This means the completion of the cooking procedures at the first cooking step. The cooking time information at the second cooking step stored in the counter 339 is counted down in the similar manner as that of the detection circuit 350 and generates the end signal END when the contents of the counter 339 become zero. The counter 339 now receives the cooking time information at the third cooking step from the register 341. Thus the cooking procedures at the second cooking step are completed.

Similar procedures are repeated concerning the cooking time information at the third cooking step stored in the register 341. The detection circuit 350 provides the end signals by the subtraction of the contents of the counter 339 to make the flip-flop 348 reset. Thus the cooking procedures at the third cooking step are terminated. The flip-flop 348 is prevented from generating the cooking signals COOK. Therefore, the microwave oven 1 is allowed to be inoperable since the relay 23 opens the relay switches 24 and 25 in response to the completion of the cooking program.

A counter 352 functions to count down calculations from a constant to zero with a predetermined frequency in response to the second signals S from the timekeeping circuit 351. The contents of the counter 352 is added to that of the register 344 by an adder 353. At first the register 344 contains the microwave output energy information at the first cooking step. In response to the subsequent generation of the end signals END from the detection circuit 350, the respective microwave output energy information at the second and third cooking steps stored in the registers 345 and 346 is, in turn, transferred into the register 344.

The output of the adder 353 is present or absent depending on whether or not there is carry in the results in one cycle of the add calculation in the counter 352. The output of the adder 353 is impressed into an AND gate 354 which has the output of the flip-flop 348. The AND gate 354 generates the microwave output control signals PW on the basis of the output of the adder 353 while there is provided the output of the flip-flop 348. The microwave output control signals PW are utilized for energizing the relay 26 as described in FIG. 9. Since the relay 26 functions to control the gate of the triac 28 as previously mentioned, the output of the adder 353 is regarded as the microwave output control signals. For example, the adder 353 provides the output in the proportion of 7:3 at each cycle of the counter 352 since the microwave output energy information is programmed as 70% in the first cooking step. Therefore, pulse signals with a duty cycle of 7/3 are introduced into the AND gate 354.

While only certain embodiments of the present invention have been described, it will be apparent to those skilled in the art that various changes and modifications may be made therein without departing from the spirit and scope of the invention as claimed.

What is claimed is:

1. A cooking utensil for conducting cooking operations on a foodstuff placed therein for a first cooking time period according to a cooking program, said program being stored on a removable memory device, comprising:

storing means for storing an amendment equation in said cooking utensil, said equation being capable of obtaining a second new time period based on said first cooking time period and a unit weight of said foodstuff, said amendment equation being, $T2=(x+yz)T1$ where $T2$ is said second new cooking time period, $T1$ is said first time period, $x$ and $y$ are weight control coefficients related to the cooking program, and $z$ is the total weight of the foodstuff; and modifying means for modifying the cooking program stored on said memory device, said modifying means calculating said second new cooking time period based on said unit weight of said foodstuff and said first cooking time period using said amendment equation stored in said storing means, said modifying means modifying the cooking program by substituting said second new cooking time period for said first cooking time period in said cooking program.

2. The cooking utensil as claimed in claim 1, wherein said cooking utensil is a microwave oven.

3. The cooking utensil as claimed in claim 1 wherein said memory device is a magnetic card, said utensil further comprising;

card reader means for reading the cooking program information stored on the magnetic card.

4. The cooking utensil as claimed in claim 1, wherein said cooking utensil is energized by a cooking power source, and wherein said means for modifying comprises:

first memory means for storing at least a first portion of the cooking time period related to the unit weight of the foodstuff for at least one cooking step of the cooking program information, second memory means for storing the weight control coefficients, third memory means for storing the microwave output energy information, representative of the microwave output energy produced by the cooking power source, when the cooking program is being executed, input means for introducing information concerning the total weight of the foodstuff to be cooked by said cooking utensil, and calculation means responsive to operation of the input means for modifying the cooking time period stored in the first memory means utilizing the weight control coefficients contained in the second memory means and the amendment equation stored in the storing means.

5. The cooking utensil as claimed in claim 4, wherein said fourth memory means comprises a read only memory (ROM).

6. A heating appliance capable of cooking a foodstuff by operating in accordance with a series of programmed instructions, comprising:
   key input means for introducing said series of programmed instructions into said heating appliance;
   a recording medium for storing said series of programmed instructions thereon, said recording medium being capable of insertion into and removal from said heating appliance;
   processor unit means responsive to actuation of a set of keys on said key input means for sequentially storing each of the instructions of said series of instructions therein and for generating a plurality of output signals indicative of respective ones of said series of instructions, said processor unit means comprising a central processing unit for receiving said series of instructions and a first storage means for storing said series of instructions therein, said series of instructions including an old cooking time;
   recording means responsive to said plurality of output signals from said processor unit means for recording each of said series of instructions onto said recording medium in response to said output signals from said processor unit means, said programmed instructions being recorded onto said recording medium at the same time said recording medium is removed from said heating appliance;
   said processor unit means including error detection means responsive to said output signals for determining if said recording medium has been improperly removed from said heating appliance prior to the complete recordation of said output signals onto said recording medium and for generating an error signal indicative of the improper removal in response thereto;
   said error signal indicating that said series of instructions should be reintroduced into said heating appliance via said key input means;
   a second storage means for storing an amendment equation therein, said equation being used to recalculate a new cooking time based on a new weight of said foodstuff cooked within said heating appliance;
   calculating means within said central processing unit and responsive to actuation of a numeral key on said key input means for recalculating said new cooking time for said foodstuff placed within said heating appliance, said calculating means utilizing said amendment equation stored in said second storage means to recalculate said new cooking time based on the value of said numeral key actuated on said key input means, said new cooking time replacing said oil cooking time within said first storage means; and
   means for operating said heating appliance and cooking said foodstuff for a time period equal to said new cooking time stored in said first storage means;
   said amendment equation comprising
   $T2 = [x + y(z)] \, T1$
   where,
   T2 represents said new cooking time,
   T1 represents said old cooking time,
   x and y represent weight control coefficients, and
   z represents the new weight of said foodstuff.

7. A heating appliance in accordance with claim 6 wherein:
   said recording medium comprises a magnetic card having said series of instructions recorded thereon, said card introducing said series of instructions into said heating appliance by the insertion of said card into said heating appliance and the proper removal of said card from said heating appliance;
   said heating appliance cooks said foodstuff in accordance with said series of instructions introduced via said key input means or introduced via said magnetic card in response to the actuation of a key on said key input means.

8. A heating appliance in accordance with claim 7, wherein said series of instructions includes an end code indicative of the end of said series of instructions; and
   wherein said error detection means comprises preliminary memory means for storing said end code;
   means for moving said end code to said preliminary memory means when said recording medium has been improperly removed from said heating appliance,
   comparator means responsive to said plurality of output signals from said processor unit means and to the movement of said end code to said preliminary memory means for developing a comparator output signal when said end code is moved into said preliminary memory means, and
   means responsive to said comparator output signal for developing said error signal in response thereto.

9. A heating appliance capable of operating in accordance with a series of programmed instructions, comprising:
   key input means for introducing said series of programmed instructions into said heating appliance, said series of instructions having a first form;
   a recording medium for storing said series of instructions, said recording medium having said series of instructions recorded thereon;
   processor unit means responsive to said series of instructions introduced via said key input means for converting said series of instructions in said first form into said series of instructions in a second form, said second form for each instructions including a plurality of bits in binary form representing the individual digits of said instructions and a parity check code associated with each of said plurality of bits, said processor unit means storing the second form of said series of instructions therein in the form of a matrix arrangement, said matrix arrangement including a plurality of columns and a plurality of rows,
   each of said columns including said plurality of bits and said parity check code, each of said rows including,
      a set of bits corresponding to one of said plurality of bits of said instructions; and
      a set of said parity check codes corresponding to each of said digits of said instructions,
   said processor unit means generating a plurality of output signals, each of said plurality of output signals being indicative of a first corresponding one of said plurality of bits for a first digit of said instructions and said parity check code associated with said corresponding one of said plurality of bits;
   first storage means responsive to said plurality of output signals for storing said first corresponding one of said plurality of bits and the associated parity check code therein, said first storage means developing output signals indicative of said first corresponding one of said plurality of bits and said associated parity check code;

first exclusive OR means responsive to said output signals from said first storage means for determining the number of 1's in the binary form of said first corresponding one of said plurality of bits and said associated parity check code and for developing a first output signal if the number of 1's determined falls within a first numerical category and for preventing the development of a first output signal if the number of 1's falls within a second numerical category;

second exclusive OR means for receiving the individual bits associated with said first corresponding one of said plurality of bits with said associated parity check code and the individual bits associated with a second corresponding one of said plurality of bits with the associated parity check code and for performing a second exclusive OR operation thereto, and developing output signals representative of the results of said second exclusive OR operation;

second storage means responsive to the output signals from said second exclusive OR means for storing the results of said second exclusive OR operation.

said second exclusive OR means repeatedly performing said second exclusive OR operation on the remaining ones of said corresponding one of said plurality of bits representing each digit of said series of instructions and the associated parity check codes;

said second storage means storing the final results of the repeatedly performed second exclusive OR operation;

means for determining if said final results of the repeatedly performed, second exclusive OR operation stored in said second storage means comprises a series of zeros and for developing a second output signal if said series of zeros is stored in said second storage means; and means responsive to said first and second output signals for operating said heating appliance when said first output signal and said second output signal are both developed;

whereby the development of said first and second output signal indicates that said series of instructions have been accurately recorded onto and read from said recording medium.

10. A cooking utensil capable of operating in accordance with a cooking program storable on an insertable and removable memory device, comprising:

input means for introducing said cooking program into said utensil;

memory device writing means for recording said cooking program introduced via said input means onto said memory device;

memory device reading means for reading said cooking program from said memory device;

an energization circuit for energizing said cooking utensil; and control means responsive to the cooking program read from said memory device by the memory device reading means for energizing said energization circuit of the cooking utensil in accordance with said cooking program read by said memory device reading means;

said cooking program being recorded on said memory device in the form of binary codes having redundant codes added thereto; and said control means of said cooking utensil further comprising, regularly checking means for checking the regularity of the binary codes of the cooking program by counting the number of 1's and 0's of said binary codes including said redundant codes and developing a go-ahead signal when an accurate number of 1's and 0's are counted, said go-ahead signal energizing said cooking utensil, said regularity checking means including, memory means for storing the binary form of said cooking program in a matrix arrangement, said matrix arrangement including rows and columns of binary numerals, each said row and column including one of said redundant codes, and circuit means for counting the number of 1's and 0's in each said column and each said row of said matrix and developing said go-ahead signal when said accurate number of 1's and o's are counted;

said circuit means of said regularity checking means comprising, a first and second storage means responsive to the cooking program from the memory means for storing the binary numerals of each of said rows and columns, respectively;

first calculation means for performing an exclusive OR calculation on the binary numerals in the first storage means;

second calculation means for performing an exclusive OR calculation on the binary numerals between the first storage means and the second storage means, respectively, a first and second detection circuit means responsive to the results of the first calculation means and the second calculation means, respectively, for providing an output when the results of the first and second calculation means indicates that said accurate number of 1's and 0's are counted, and an AND gate means responsive to the output from the first detection circuit means and the second detection circuit means for developing the go-ahead signal for energizing said cooking utensil.

11. A cooking utensil as claimed in claim 10, wherein said cooking utensil is a microwave oven.

12. A cooking utensil as claimed in claim 10, wherein said first calculation means comprises gate means for checking the number of 1's and 0's for each of the binary numerals in the rows of said matrix arrangement, and said second calculation means includes gate means for checking the number of 1's and 0's for each of the binary numerals in the columns of said matrix arrangement.

13. A cooking utensil as claimed in claim 10, further comprising announcement means responsive to the presence of said go-ahead signal from said AND gate means for providing an announcement indicating the presence of an error in the cooking program stored on the magnetic card, the output of said AND gate means indicating an inaccurate number of 1's and 0's counted by said regularity checking means when said go-ahead signal is not developed.

14. A cooking utensil as claimed in claim 10, further comprising:

a cooking power source for energizing said cooking utensil;

relay means for controlling the energization of said cooking power source; and restricting means responsive to the presence of the go-ahead signal from said AND gate means for preventing the relay means from controlling said cooking power source when said go-ahead signals are not developed by said AND gate means.

15. A cooking utensil in accordance with claim 10, further comprising indicator means for providing an indication of the cooking operations being performed by said utensil according to said cooking program stored therein and recorded on said memory device, said indicator means sequentially displaying the individual steps of the cooking program in a predetermined order, said order of the sequential display on said indicator means corresponding to the order in which the cooking steps of the program are sequentially executed by said cooking utensil.

16. A cooking utensil in accordance with claim 15, wherein said indicator means comprises numeral display means for indicating a cooking time information portion of the cooking program, the cooking time information being representative of a time duration during which a cooking power source is energized for energizing said cooking utensil, and
operation indicator display means for indicating a microwave output energy information portion of the cooking program, the microwave output energy information being representative of the output energy conditions of the cooking power source while the cooking program is being executed by the cooking utensil.

17. A cooking utensil in accordance with claim 15, wherein said indicator means further comprises:
first memory means for storing the cooking program therein,
timing control means for developing timing signals to energize the first memory means,
second memory means for successively receiving the individual steps of the cooking program from the first memory means in response to the development of each of said timing signals, and
driver means responsive to the contents of said second memory means for driving said indicator means to display the individual steps of the cooking program contained within said second memory means.

18. A cooking utensil capable of operating in accordance with a cooking program storable on an insertable and removable memory device, comprising:
input means for introducing said cooking program into said utensil;
memory device writing means for recording said cooking program introduced via said input means onto said memory device;
memory device reading means for reading said cooking program from said memory device;
an energization circuit for energizing said cooking utensil; and
control means responsive to the cooking program read from memory device by the memory device reading means for energizing said energization circuit of the cooking utensil in accordance with said cooking program read by said memory device reading means;
said cooking utensil conducting cooking operations on a foodstuff placed therein for a first cooking time period according to said cooking program, said program being stored on said removable magnetic card;

wherein said cooking utensil further comprises:
storing means for storing an amendment equation therein, said amendment equation including a means for calculating a second new cooking time period based on said first cooking time period and a unit weight of said foodstuff; and
modifying means for modifying the cooking program stored on the magnetic card, said modifying means re-calculating said second new cooking time period as a function of said unit weight of said foodstuff and said first cooking time period using said amendment equation and recording said second new cooking time period on said magnetic card, said amendment equation comprising
$$T2 = (x + y \times z)\,T1$$
where $T2$ is said second new cooking time period, $T1$ is said first time period, $x$ and $y$ are weight control coefficients related to the cooking program, and $z$ is the total weight of the foodstuff.

19. A cooking utensil as claimed in claim 18, wherein said cooking utensil is a microwave oven.

20. The cooking utensil as claimed in claim 18, wherein said cooking utensil is energized by a cooking power source, said cooking power source producing microwave output energy;
and wherein said modifying means comprises;
first memory means for storing at least a first portion of the cooking time period related to the unit weight of the foodstuff for at least one cooking step of the cooking program,
second memory means for storing the weight control coefficients,
third memory means for storing the microwave output energy associated with the cooking power source which is energizing the cooking utensil when the cooking program is being executed,
means for introducing information concerning the total weight of the foodstuff to be cooked by said cooking utensil, and
calculation means responsive to the means for introducing for modifying the cooking time period stored in the first memory means utilizing the weight control coefficients contained in the second memory means and the amendment equation stored in the storing means.

21. A cooking utensil in accordance with claim 18, wherein said control means further comprises:
processor unit means responsive to the introduction of the cooking program via the input means for sequentially storing said cooking program therein and for generating a plurality of output signals indicative of the individual instructions of said cooking program;
means responsive to said plurality of output signals from said processor unit means for recording each of said output signals onto said memory devices; and
said processor unit means including error detection means responsive to said output signals for determining if said memory device has been improperly removed from said cooking utensil prior to the complete recordation of said output signals onto said memory device and for generating an error signal indicative of the improper removal in response thereto,
said error signal indicating that said cooking program should be reintroduced into said cooking utensil via said input means.

22. A cooking utensil capable of cooking a foodstuff for a first cooking time period in accordance with a cooking program stored on a removable magnetic card, comprising:

input means for introducable said cooking program into said utensil;

magnetic card writing means for recording said cooking program introduced via said input means onto said magnetic card in the form of binary codes having redundant codes added thereto;

magnetic card reading means for reading said cooking program from said magnetic card;

an energization circuit for energizing said cooking utensil;

control means responsive to the cooking program read from said magnetic card by the magnetic card reading means for energizing said energization circuit of the cooking utensil in accordance with said cooking program read by said magnetic card reading means, said cooking means including, regularity checking means for checking the regularity of the binary codes and the redundant codes of the cooking program and developing a go-ahead signal when an accurate check of the regularity of the binary and redundant codes is obtained, said go-ahead signal energizing said energization circuit;

display means for sequentially displaying the individual steps of said cooking program in a predetermined order, the predetermined order corresponding to the order in which the individual steps of the cooking program are sequentially executed by said cooking utensil;

means for calculating a second cooking time period based on the first cooking time period and on a unit weight of said foodstuff; and means for modifying the cooking program on said magnetic card to include said second cooking time period in lieu of said first cooking time period.

* * * * *